United States Patent [19]

Traylor

[11] Patent Number: 4,553,587
[45] Date of Patent: Nov. 19, 1985

[54] BACKFLUSH COUPLING AND METHOD FOR INTERNAL COMBUSTION ENGINE COOLING SYSTEM

[76] Inventor: Paul L. Traylor, 16591 Milliken Ave., Irvine, Calif. 92714

[21] Appl. No.: 523,371

[22] Filed: Aug. 15, 1983

[51] Int. Cl.[4] .............................................. F28G 1/12
[52] U.S. Cl. ...................................... 165/95; 285/86; 285/177
[58] Field of Search ...................... 165/95; 285/14, 31, 285/93, 81, 86, 174, 177, 354

[56] References Cited

U.S. PATENT DOCUMENTS

| | | | |
|---|---|---|---|
| 204,135 | 5/1878 | Convery | 137/216.2 |
| 878,430 | 2/1908 | Thomson | 137/216.2 |
| 961,343 | 6/1910 | Evans | 251/158 |
| 1,227,842 | 5/1917 | Sellin | 73/113 |
| 1,303,367 | 5/1919 | Nelson | 285/70 |
| 1,326,250 | 12/1919 | Brown et al. | 285/174 |
| 1,889,705 | 11/1932 | Sherwood | 73/209 |
| 2,208,706 | 7/1940 | Spencer | 285/84 |
| 2,219,218 | 10/1940 | Berger et al. | 285/86 |
| 2,768,844 | 10/1956 | Schadeberg | 285/177 |
| 3,046,698 | 7/1962 | Breen et al. | 47/52 |
| 3,550,612 | 12/1970 | Maxon | 137/112 |
| 3,672,467 | 6/1972 | Fleissner | 184/1 C |
| 3,792,711 | 2/1974 | Bedard | 137/217 |
| 3,833,019 | 9/1974 | Diggs | 138/45 |
| 3,861,394 | 1/1975 | Villari | 128/349 R |
| 3,907,342 | 9/1975 | Dudek | 285/242 |
| 4,083,399 | 4/1978 | Babish et al. | 165/95 |
| 4,105,095 | 8/1978 | Thrasher, Jr. | 184/55 A |
| 4,109,703 | 8/1978 | Babish et al. | 165/1 |
| 4,127,160 | 11/1978 | Joffe | 165/1 |
| 4,161,979 | 7/1979 | Stearns | 165/95 |
| 4,176,708 | 12/1979 | Joffe | 165/95 |
| 4,178,134 | 12/1979 | Babish | 417/181 |
| 4,185,654 | 1/1980 | Young | 137/218 |
| 4,209,063 | 6/1980 | Babish et al. | 165/95 |
| 4,293,031 | 10/1981 | Babish | 165/95 |
| 4,458,926 | 7/1984 | Williamson | 285/354 |

Primary Examiner—William A. Cuchinski, Jr.
Attorney, Agent, or Firm—Fulwider, Patton, Rieber, Lee & Utecht

[57] ABSTRACT

A backflush coupling and method for flushing the cooling system of an internal combustion engine. The preferred method comprises cutting the coolant discharge hose which extends from the engine to a heater and installing the male and female connector halves of a backflush coupling into the cut ends. The installed backflush coupling constitutes a conduit for normal coolant flow. The coupling is disconnectable for attachment of a flushing hose to the female connector half, the male connector serving as a drain. A union sleeve facilities assembly and disassembly of the coupling connector halves. The coupling is adapted to fit within heater hoses of different sizes, and certain embodiments signal over pressurization of the cooling system, reveal condition of the coolant and indicate general rate of flow, and provide for air induction for mixture with the flushing liquid. A locking device prevents inadvertent separation of the coupling connector halves.

16 Claims, 12 Drawing Figures

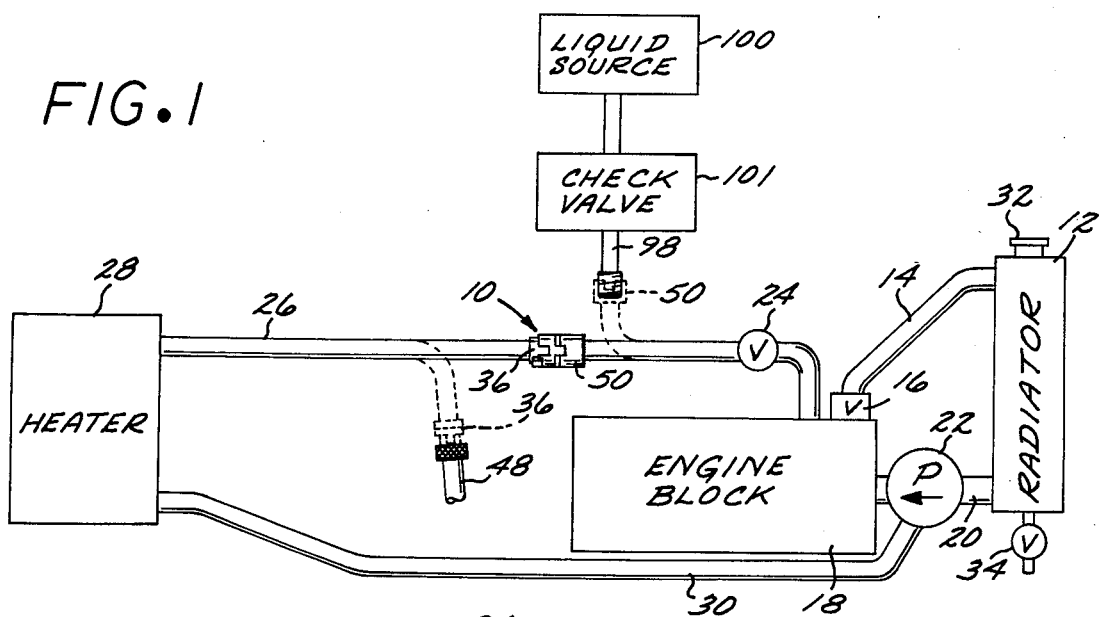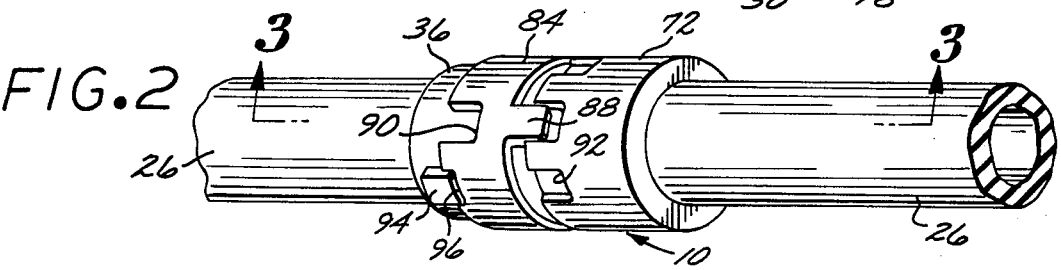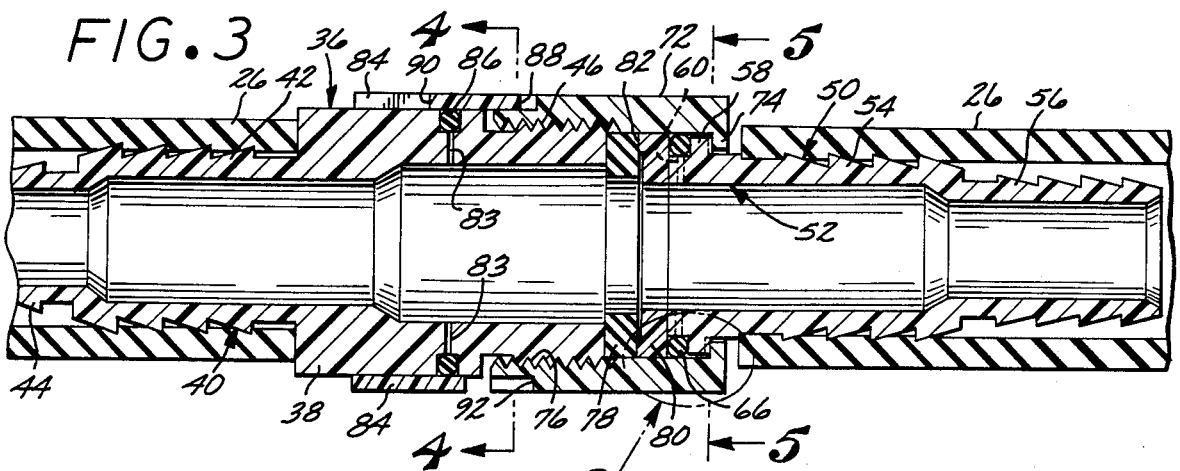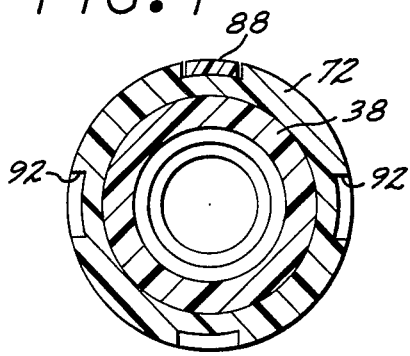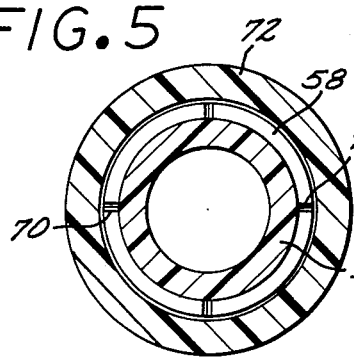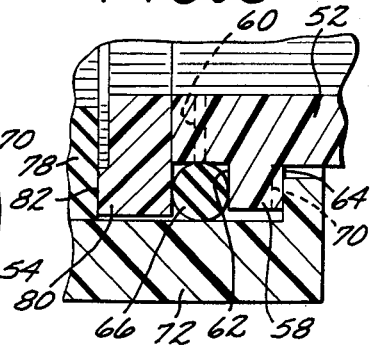

BACKFLUSH COUPLING AND METHOD FOR INTERNAL COMBUSTION ENGINE COOLING SYSTEM

BACKGROUND OF THE INVENTION

1. Field of the Invention

The invention relates to a method and apparatus for flushing the cooling system of an internal combustion engine.

2. Description of the Prior Art

Periodic backflushing of the cooling system of internal combustion engines is necessary to flush away accumulated sediment and deposits such as rust and scale. The accumulation of such material in the cooling system clogs components such as the radiator core, thermostat and heater valve, and interferes with efficient operation of the system, adversely affects the engine operating temperature and causes premature engine wear and failure.

The typical motor vehicle cooling system includes a radiator, engine block and heater. A do-it-yourself motorist usually flushes the cooling system by simply removing the radiator cap, draining the coolant from a low point in the system, and forcing water into the radiator with a garden hose. This is largely ineffective since it does not reversely circulate water through the engine block or the heater, nor does the water pass through the thermostat, which would be closed because of the relatively low temperature of the flushing water.

Commerical backflushing of cooling systems is effective to reversely circulate flushing liquid and thereby dislodge accumulated deposits, but it is a significant maintenance expense and requires a trip to a garage or other repair facility.

An increasing number of motorists are beginning to backflush their own cooling systems and various devices have been made available to reach this market. However, no one device provides all of the basic features needed. Some are not portable, many are too costly, and most are too complicated or cumbersome to use. Ideally, a backflushing system should be easily installable and readily available for the periodic use necessary to keep a cooling system in proper operating condition.

One system of the prior art employs a "T" fitting which is permanently installed in the heater hose between the engine block and the heater. The third leg of the "T" is capped when the fitting is not being used for backflushing. For backflushing the cap is removed and a garden hose is attached to force water through the cooling system. However, the water is forced out the two legs of the "T" in opposite directions, most going into and out of the radiator via the most convenient path or path of least resistance. Because most engines must be run during backflushing, the usual water pump bucks or resists the intended backflush water circulation. Thus, there is little if any flushing action on the heater, hoses, engine block, or water pump, the backflushing being essentially confined to the radiator. Insofar as is known, most other systems are not permanently installed as a part of the cooling system. Consequently, for periodic backflushing of the cooling system, it is necessary to disconnect hoses and locate and reinstall the system components required for such backflushing.

SUMMARY OF THE INVENTION

According to the present invention, a backflush coupling and method is provided which is adapted to quickly and easily flush the cooling system of an internal combustion engine. The preferred method comprises cutting of the upper heater hose extending between the engine block and the heater, and installing male and female connector halves of a backflush coupling into the cut ends. The second or lower heater hose, connecting the heater to the water pump could also be used, if desired, since the coupling can be readily installed into the heater hose for flushing flow in either direction. A union fitting provides a convenient threadably interconnection between the connector halves so that coolant can flow through the installed backflush coupling during normal operation of the engine. Lock means are provided to secure the interconnection against any unintentional or inadvertent separation.

Periodic flushing of the cooling system is easily accomplished by simply unlocking the locking means, rotating the union sleeve to separate the male and female connector halves, placing the male connector half in a convenient position to act as a drain, and connecting a garden hose or the like to the female connector half. Water or any suitable liquid under pressure from a suitable source is then circulated in a backflush direction through the engine block, past the water pump, upwardly through the radiator and out the radiator cap, in those instances where it has been opened or removed. Water also circulates past the water pump and through the heater for discharge to drain through the male connector half. This method affords a fairly thorough backflushing through all of the major components of the cooling system. If desired, the garden hose can then be connected to the male connector half of the coupling to circulate fluid into the conduits leading from that connector half. This added flushing provides additional cleaning of the cooling system.

The connector halves include stepped or two diameter portions so that they are adapted to fit within at least two different sizes of radiator hose. Moreover, one of the connector halves includes a resilient element overlying one or more pressure relief openings, the element being forced away from the openings at a predetermined pressure to allow liquid to pass through the openings and thereby signal an over-pressure condition in the cooling system. This liquid leakage is permitted in one position of a reversible stop element, but in another position the stop element effects a positive seal of the pressure relief openings and prevents any leakage, even at high system internal pressures.

In one embodiment a portion or portions of the coupling is made transparent to enable examination of the character and rate of flow of the coolant during either normal or backflush operation of the cooling system. If desired, a ramp and ball indicator means may be temporarily installed during flushing with the backflush coupling to provide a more positive indication of the rate of flow of the coolant. In yet another embodiment an aspirator is temporarily incorporated during flushing operations to the coupling to introduce air and thereby provide a more turbulent flushing action for improved purging.

Other objects and features of the invention will become apparent from consideration of the following description taken in connection with the accompanying drawings.

BRIEF DESCRIPTION OF THE DRAWINGS

FIG. 1 is a schematic view of the present backflush coupling installed in the cooling system of a typical internal combustion engine;

FIG. 2 is a perspective view of the present backflush coupling;

FIG. 3 is an enlarged view taken along the line 3—3 of FIG. 2;

FIG. 4 is a view taken along the line 4—4 of FIG. 3;

FIG. 5 is a view taken along the line 5—5 of FIG. 3;

FIG. 6 is an enlarged detail view taken in the area denoted by the numeral "6" in FIG. 3;

DESCRIPTION OF THE PREFERRED EMBODIMENTS

Figure 7:
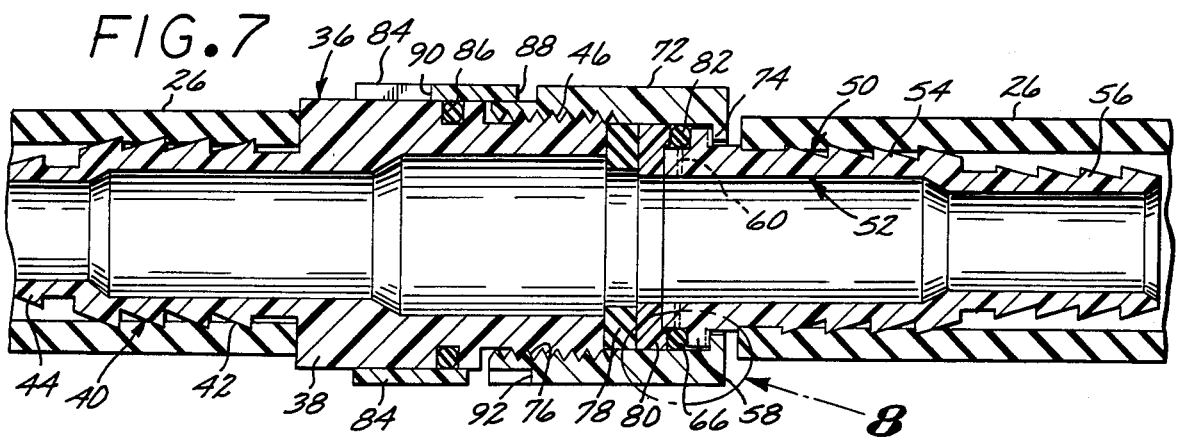
FIG. 7 is a view similar to FIG. 3, but illustrating the stop element in a reversed position, wherein it bears against the resilient sealing element to disable the excess pressure leakage function.

Referring now to the drawings, and particularly to FIGS. 1-6, there is illustrated a backflush coupling 10 for use in conjunction with the cooling system of an internal combustion engine, the cooling system comprising, generally, a radiator 12, an inlet hose 14, a thermostat 16, an engine block 18, a bottom or outlet hose 20 from the radiator 12, a water pump 22, a heater valve 24, a heater inlet hose 26, a heater 28, and a heater outlet or return hose 30.

A preferred procedure is backflushing the cooling system is to first add a suitable flushing cleaner or chemical composition by pouring it into the radiator cap opening. The radiator cap 32 is replaced and the engine is operated until the coolant temperature has risen sufficiently to open the thermostat 16 for circulation of the coolant and cleaner through the radiator, and also to open the heater valve 24 to enable circulation of the coolant and cleaner through the heater 28 and through the balance of the cooling system conduits. Any of various cooling system flushing agents or chemicals are commercially available for this purpose. After a prescribed interval, the engine is then stopped, cap 32 is removed, and the radiator drain valve 34 is opened to drain the system. Depending upon the radiator design, the valve 34 is then closed and the system is ready for back flushing. In some cooling system designs it may be more advantageous to leave the radiator cap 32 in place while flushing the system, as will be apparent to those skilled in the art.

Normal flow of engine coolant through an automotive cooling system is from the water pump 22 to the engine block 18. Once in the engine block, the coolant can take two paths, one through the heater valve 24, then to the heater inlet hose 26, through the heater 28, and back through the heater outlet hose 30 to the water pump 22. The other path is through the thermostat 16, the radiator inlet hose 14, the radiator 12, and back to the water pump 22 through the radiator outlet hose 20.

It is an object of the present invention to facilitate backflushing so that it can be done simply and quickly by relatively inexperienced motorists. For this reason, the backflushing coupling 10 preferably is installed in the most readily accessible portion of the cooling system, that is, in the upper heater inlet hose 26 which is normally located above the engine in plain view. The heater outlet hose 30 is usually accessible and the coupling 10 could also be installed and used in this conduit if desired.

Using a sharp knife or single edge razor blade, the hose 26 is slit transversely and the backflushing coupling 10 inserted into the cut ends so that it forms a permanent coolant circuit during normal operation of the cooling system.

The internal diameter of the hose 26 often varies from one engine to the next and the coupling 10 is made to fit within hoses of various sizes. More particularly, the coupling 10 comprises, generally, a male connector half 36 having an elongated, cylindrical hollow body 38 characterized by an outer extremity 40 having an inner tapered step 42 of a diameter adapted to be press fitted into the cut end of the section of hose 26 leading to the heater 28. The male connector outer extremity 40 also includes an outer tapered step 44 having a lesser outer diameter, compared to the tapered step 42, so that it is insertable within a heater inlet hose 26 of lesser internal diameter.

The tapered steps 42 and 44 are each characterized by a succession of longitudinally spaced apart circumferential barb flanges adapted to relatively easily slide into the hose, but configured to resist being pulled out of the hose, as will be apparent.

The inner extremity of the male connector body 38 is reduced in diameter and provided with male threads 46 adapted to be threadably engaged by the female end of a garden hose 48. As will be seen, the male connector half 36 preferably serves as the drain line during the backflushing operation and can be used to drain onto a driveway or the like, or the garden hose 48 can be attached to it to allow drainage to a gutter, sink drain or the like.

The backflush coupling 10 also comprises a female connector half 50 having an elongated, cylindrical hollow body 52 provided at its outer extremity with an inner tapered step 54 and an outer tapered step 56 identical in construction and configuration to the steps 42 and 44 of the male connector half 36. The inner tapered step 54 is forcibly inserted into the section of the heater hose 26 which extends to the heater valve 24.

Although not shown, usual hose clamps are disposed about the ends of the hose 26 adjacent the tapered steps 42 and 54 to securely hold the coupling 10 within the cut ends of the hose 26.

The inner extremity of the hollow body of the female connector half 50 includes an annular flange 58 adjacent a lesser diameter end portion.

As best seen in FIG. 6, the annular flange 58 includes a front seating surface 62 and a rear seating surface 64. An annular sealing means or O-ring 66 is disposed upon the front seating surface. In addition, for a purpose which will become apparent, one or more radially extending passages 60 extend from the interior or bore of the female connector body 52 to the outer circumferential surface of the end portion beneath the O-ring 66, the passages 60 normally being closed and sealed off by the O-ring 66. Also, the rear seating surface 64 is provided with one or more radially extending grooves 70 which, as will be seen, are adapted to allow air to pass to the area in which the O-ring 66 is located.

The female connector half 50 also includes a cylindrical union nut or sleeve 72 having an annular wall 74 at one extremity for seating against the rear seating surface 64. The opposite extremity of the union sleeve 72 is provided with female theads 76 adapted to engage upon the male threads 46 of the male connector half 36 to secure the coupling 10 together. The union sleeve 72 renders the connection of the mating portions of the coupling 10 comparatively easy since only relative rotation of the sleeve 72 is necessary to effect the connection.

A fluid tight seal is provided by an annular washer 78 bearing on one side against the end of the male connector half 36, and at the other side against an annular stop washer 80 whose opposite face bears against the end of the female connector half 50 and against the O-ring 66.

Rotation of the union sleeve 72 in one direction compresses the O-ring 66 and the washer 78 to establish a fluid tight connection whereby the coupling 10 may serve as a conduit for coolant in the normal operation of the cooling system. The union sleeve 72 is rotatable in an opposite direction to enable separation of the connector halves 36 and 50 to apply flushing liquid to the cooling system for backflushing, as will be seen. Clearance spaces are defined between the union sleeve 72 and the adjacent portions of washer 80, flange 58 and body 52.

In the coupled state illustrated in FIG. 3, the dimensions of the components are carefully selected so that upon attainment of a predetermined excessive pressure in the cooling system, such as above approximately 20 pounds per square inch, the excessive pressure, acting through the passages 60, will tend to circumferentially outwardly expand the O-ring 66 away from the passages 60 and allow flushing liquid to flow past the O-ring and through the clearance spaces provided between the flange 58 and the confronting portions of the union sleeve 72 and the female connector 50. The escape of such fluid will generally be apparent upon any periodic inspection of the engine coolant system and, in any event, would be noticed as a collection of coolant on the floor or driveway or as a wet condition around the immediate area of the coupling. Over pressurization of the cooling system is a hazardous condition in that it tends to cause failure of hoses and hose connections and adversely affects or destroys other cooling system components.

Figure 8:
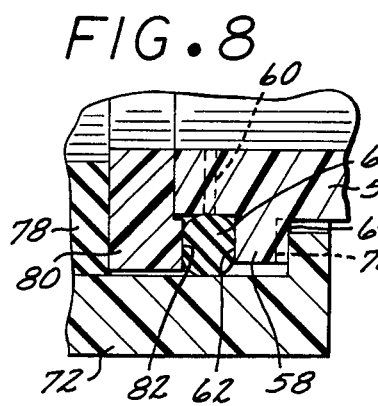
FIG. 8 is an enlarged detail view taken in the area denoted by the numeral "8" in FIG. 7.

In the event that the motorist elected to sacrifice the over pressurization feature and did not wish to have coolant escape under any conditions, the stop washer 80 can be reversed in position to accomplish this. In the position of the stop washer 80 illustrated in FIG. 3, the rear face of the washer is flat, while the opposite face includes a central shallow bore defining an axially extending annular face 82. On disassembly of the coupling 10, the washer 80 can be reversed in position so that the annular face 82 bears against the O-ring 66, whereupon forcible tightening of the union sleeve 72 on reassembly will exert sufficient compressive force upon the O-ring 66 that it cannot be circumferentially moved away from the passage 60 despite any over pressure condition in the cooling system. This stop leak position of the washer 80 is illustrated in FIGS. 7 and 8.

One or more passages 83, FIG. 3, are preferably provided in the male connector half 36, leading from the interior bore of the body 38 to the annular seat for an O-ring 86. The O-ring 86 acts in a manner similar to the operation of the O-ring 66 previously described, but is useful in signaling over pressure conditions when a source of pressure, such as a garden hose is attached by a suitable adaptor to the male connector half 36, rather than the female connector half 50. Further, if desired, O-rings 86 and 66 can be selected such that each releases fluid at a different pressure, thereby affording an indication of operation of the system between two predetermined pressures.

It is important that the coupling 10 remain coupled despite engine vibration, road shocks and the like, and a lock sleeve 84 is provided for this purpose. The lock sleeve 84 is cylindrical and of an internal diameter to closely slidably fit over the cylindrical outer surface of the male connector body 38, as best seen in FIGS. 3 and 4. The groove for the O-ring 86 is located adjacent the threads 46 to normally underlie the sleeve 84, providing frictional constraint to prevent inadvertent separation of the sleeve 84 from the male connector half 36 when the coupling 10 is decoupled. The sleeve 84 would be moved from its overlying relation to the O-ring 86 whenever it was desired to enable the O-ring 86 to lift off its seat to signal an over pressure condition.

The lock sleeve is characterized by an axially extending locking tab 88 at one edge, as seen in FIG. 2, and by a cutaway portion or tab slot 90 in its opposite edge adjacent the tab 88. The tab 88 is adapted to slidably enter and fit within any one of a plurality of axially extending, equally circumferentially spaced tab seats 92.

The tab slot 90 is adapted to slidably receive a generally rectangular lock element 94 projecting radially outwardly of and integral with the male connector half body 38.

In order to securely lock the coupling 10 together, the mating halves 36 and 50 are fitted together and the union sleeve 72 is tightened with hand pressure, which is usually sufficient to effect a good fluid tight seal against the O-ring 66 and the washer 78, the lock sleeve 84 at this time having been moved to the left such that the lock element 94 is received within the tab slot 90. This locates the locking tab 88 out of the way of the rotating sleeve 72. Next the lock sleeve 84 is axially slid to the right to locate the locking tab 88 within the closest one of the tab seats 92. The union sleeve 72 is then rotated or advanced a partial turn to align the lock element 94 with a shallower tab slot 96 adjacent the deeper tab slot 90. Leftward movement of the lock sleeve 84 will now locate the lock element 94 within the tab slot 96, but without complete disengagement of the locking tab 88 from the tab seat 92. Consequently, relative rotation between the connector halves 36 and 50 is impossible without deliberate axial movement of the lock sleeve 84 to disengage the lock element 94 from the tab slot 96. Further, seal 86 offers significant resistance to movement of sleeve 84 and this precludes inadvertent rotation of sleeve 84 even with slots 90 and 96 disengaged from the locking element 94, thus tending to maintain the coupling halves joined together. The sealing washer 78 also tends to prevent relative rotation of the connector halves.

In the permanent or in-line position of the coupling 10 illustrated in FIG. 2, it may be desirable to determine the condition and flow rate of the coolant through the cooling system. In that event, one or more of the components of the coupling 10 can be made of transparent material so that the motorist can determine if the coolant is characterized by a suspension of rust particles, for example, and also can determine the rate of flow by gauging the speed of passage of entrained bubbles or the like.

From the foregoing it will be apparent that in the installed position of the coupling 10 there is no adverse affect on the normal operation of the engine cooling system. However, the coupling can be readily decoupled to perform the periodic backflushing which is so important to the proper maintenance of the engine cooling system. As previously indicated, this can be done by appropriately positioning the lock sleeve 84 to enable relative rotation and separation of the connector halves 36 and 50. Next, as schematically indicated in FIG. 1, the male end of a garden hose 98 is threaded into the female connector half 50 and water or suitable liquid under pressure from a suitable source 100, such as the water supply system of a household, is directed through any of many commercially available one way anti-siphon or check valves 101 to the heater inlet hose section leading to the heater valve 24. At this time the stop washer 80 is preferably in the position illustrated in FIG. 3 so that over pressurization of the cooling system by the source 100 can be immediately detected by noting any leakage of flushing water past the O-ring 66. If leakage occurs, it will appear adjacent the annular wall 74, and the degree of leakage will give some indication of the amount of over pressurization. Also, the degree of leakage may be used as a visual aid in adjusting the fluid flow at the source such that an adequate inlet pressure is applied through the hose 98 upon the cooling system.

During the backflushing operation water under pressure will pass through the engine block, through the water pump 22 and upwardly through the radiator 12, the radiator cap 32 preferably being removed to enable drainage of some of the flushing liquid through the radiator cap opening. Other flushing liquid back flows through the heater outlet hose 30, through the heater 28, and out of the male connector half 36 to any suitable drain, or through the garden hose 48 if the hose 48 is being used for drainage. In most instances it is desirable to have the engine running during the backflushing operation, although this is not always essential. As will be seen, it is advisable in some cooling systems to leave the radiator cap 32 in position for a portion of the backflushing operation.

Figure 9:
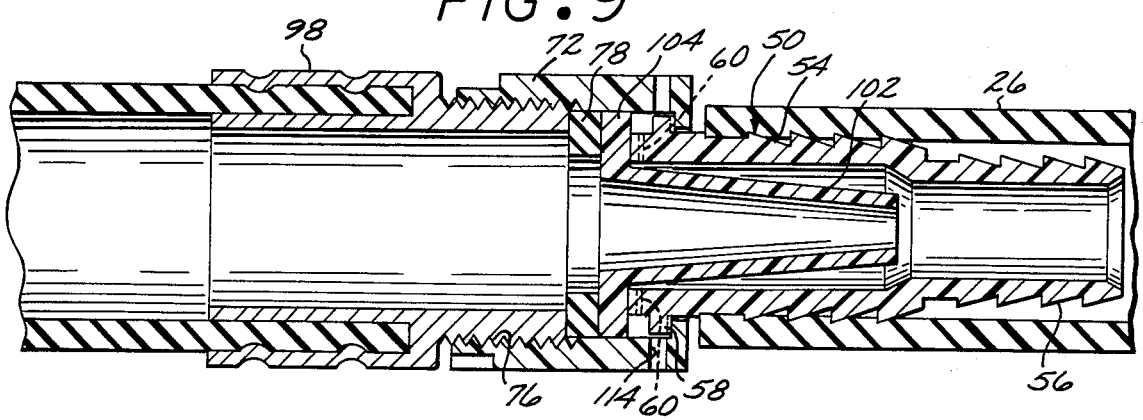
FIG. 9 is a view similar to FIG. 3, but illustrating a garden hose attached to another embodiment of a female connector half, and in which an aspirator is included for use during backflushing.

It is advantageous to create a turbulent flow of coolant fluid through the cooling system during the backflushing operation and for this purpose air can be aspirated into the flushing liquid flow by employing an aspirator 102, as best seen in FIG. 9. The aspirator includes an axially extending portion of circular transverse cross section which diminishes in diameter in a downstream direction. The upstream end of the aspirator includes an annular flange 104. In using the aspirator 102, O-ring 66 is removed, the stop washer 80 is removed, and the flange 104 of the aspirator 102 is placed in the same position previously occupied by the washer 80. Water flowing through the aspirator 102 produces a low pressure area adjacent the plurality of passages 60, drawing in or aspirating air from around the flange 58 and through radially directed passages 114 which may be provided in the sleeve 72 adjacent the flange 58, as seen in FIG. 9. This air mixes with the water at the tip of aspirator 102 and passes into the cooling system.

Figure 12:
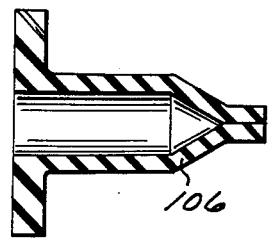
FIG. 12 is a longitudinal cross sectional view of a back check device that may be incorporated in the female connector half of FIG. 10 during a backflush operation.

The back check 106 of FIG. 12 is made of elastomeric material and is pinched closed at its down stream end. The pinched end opens under the pressure of the flushing liquid, but closes if any reverse flow of the flushing liquid were to occur. The back check 106 thus serves as a check valve to supplement operation of the check valve 101. In normal use of the cooling system, back check 106 would be removed, as would be the aspirator 102 described previously.

Figure 11:
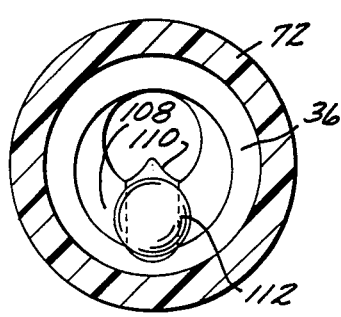
FIG. 11 is a view taken along the line 11—11 of FIG. 10.
Figure 10:
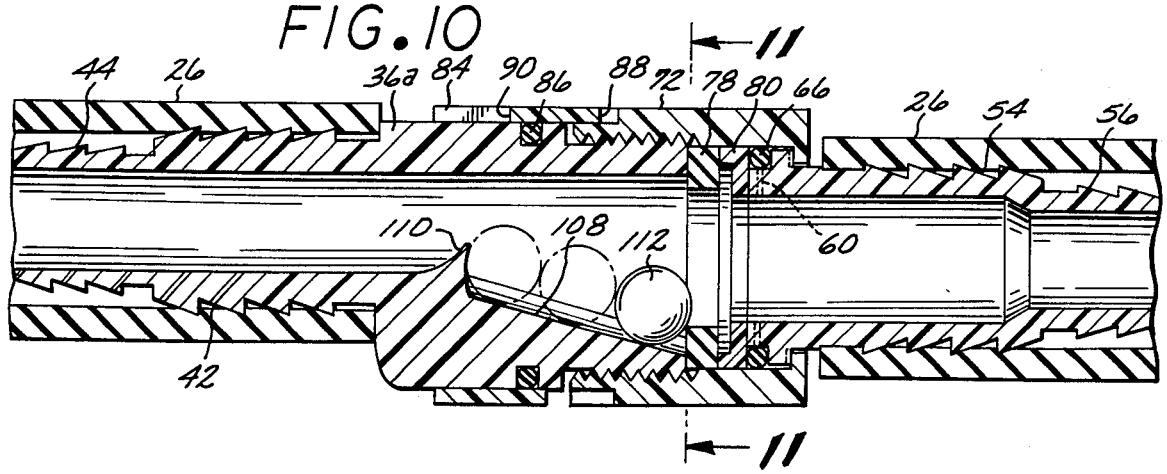
FIG. 10 is a view of yet another embodiment of the invention in which a ramp and ball indictor means is incorporated in the male connector half of the backflush coupling.

With reference to FIGS. 10 and 11, an embodiment of the coupling is illustrated which utilizes transparent material for the male connector half 36a and the lock sleeve 84. In addition, the internal bore of the connector half 36a is provided with an inclined portion or ramp 108 which defines an internal coolant passage of progressively smaller size in a downstream direction, assuming normal operation and coolant flow. The downstream end of the ramp 108 includes a stop 110 which limits the downstream movement of a ball 112 located on the ramp 108. The rate of flow of the coolant moves the ball 112 further up the ramp, thereby giving an indication of the rate of flow of the coolant, and thus affording a check on the proper operation of the water pump 22, or on the existence of possible blockages in the system. The ball 112 would normally be removed during usual operation of the cooling system to reduce resistence to coolant flow.

When backflushing is completed, the coupling is simply recoupled and any good grade of antifreeze or other coolant is added to the cooling system with fresh water.

From the foregoing it will be apparent that the coupling 10 is relatively economical to manufacture and simple for the average motorist to install and use. Backflushing is easily accomplished by attachment of the householder's garden hose, following which the coupling can be reconnected to remain with the vehicle in position for immediate use during periodic maintenance. It is a particular feature of the coupling 10 that the backflushing liquid flow is uni-directional at any given time. Usually it is quite sufficient and thorough to introduce source liquid only into the female connector half. However, it could be introduced into the male connector half. Also, if desired, the coupling 10 could be incorporated instead in the lower or outlet heater hose 30. Backflushing in this situation would be achieved by installing the female connector half 50 in the slit end of the portion of the heater hose 30 leading to the heater 28.

Transparent components can be utilized to provide an indication of the condition and flow rate of the engine coolant. Moreover, during either backflushing or normal use, the coupling can be employed to provide an indication of coolant system over pressurization. The lock sleeve also provides assurance against accidental loosening and separation of the coupling 10 during normal engine operation, and gives a visual indication of its locked condition. The union connection greatly facilitates connection and disconnection of the coupling connector halves in that no rotation of the connector halves within their respective hose ends is necessary. Air aspiration is readily available by incorporating a separate aspirator within the coupling, and a relatively minor modification of the internal configuration of one of the connector halves permits incorporation of a fluid flow indicator.

The cooling system described and illustrated in the drawings is typical but variations in cooling systems, engines and radiators may require some deviations from the procedure recommended. In some cases backflushing should be done with the engine running, in some cases not. This is also true with respect to whether or not the radiator cap should be removed, and whether or not the radiator drain valve should be left open. Also, in many situations it is not necessary to use a check valve between the liquid source and the cooling system. However, if potable water is used as the source liquid, always use a suitable check valve 101. Otherwise, it would be possible during backflushing to contaminate the water supply. These individual differences do not, however, alter the basic operation of the present coupler and method.

Further, although the preferred embodiment of the coupling includes tapered steps or hose barbs to facilitate insertion of the coupling into the cut ends of a radiator hose, it is contemplated that other end fittings could be used, so long as the end result is installation of the coupling in fluid communication with the heater hose. Thus, an auto manufacturer could install one of the connector halves, preferably the female connector, integral with the engine, heater valve, or water pump, or threadably connected thereto. The heater hose would then be clamped to the other connector half.

It should also be noted that the present coupling is useful in an emergency to mend a heater hose. The hose on opposite side of the failure would be cut and clamped to the connector halves, not only providing a hose repair, but also providing a future backflushing capability, as needed.

Various modifications and changes may be made with regard to the foregoing detailed description without departing from the spirit of the invention.

I claim:

1. In an internal combustion engine having a cooling system which includes a heater hose, an improved backflush coupling disposed in fluid communication with said heater hose as-an integral part thereof during normal operation of said engine and comprising:

a male connector half having an elongated hollow body fixed at its outer extremity in communication with said heater hose and provided at its inner extremity with male threads; and a female connector half having an elongated hollow body fixed at its outer extremity in communication with said heater hose, the inner extremity of said hollow body of said female connector half including an annular flange having a front seating surface and a rear seating surface, first sealing means disposed between said male and female connector halves to provide a fluid tight seal therebetween, said female connector half further having a union sleeve having an annular wall at one extremity for seating against said rear seating surface, and having female threads at its opposite extremity threadable upon said male threads whereby said union sleeve may be rotated in one direction to compress said sealing means, against the adjacent end of said male connector thereby to establish a fluid tight connection whereby said backflush coupling may serve as a conduit for coolant in the normal operation of said engine, said union sleeve being rotatable in an opposite direction to enable separation of said male connector half from said femal connector half for attachment of a hose to one of said male and female connector halves to apply fluid to said cooling system, and for use of the other of said male and female connectors as a drain.

2. A backflush coupling according to claim 1 wherein said outer extremity of said male connector half and said outer extremity of said female connector half are characterized by adjacent sections of different outside diameters for fitting within corresponding different internal diameter heater hoses.

3. A back flush coupling according to claim 1 including aspirator means in said female connector body, and further including fluid passage means opening from the exterior of said female connector body to said aspirator means whereby air may be drawn into a low pressure region adjacent said aspirator means.

4. A backflush coupling according to claim 1 including back check means in said female connector body having means operative to pass fluid in only one direction.

5. A backflush coupling according to claim 1 wherein said male connector half and said female connector half are substantially equal in overall length and outer diameter.

6. In a internal combustion engine having a cooling system which includes a heater hose, an improved backflush coupling disposed in fluid communication with said heater hose and comprising:

a male connector half having an elongated hollow body fixed at its outer extremity in communication with said heater hose and provided at its inner extremity with male threads;

a female connector half having an elongated hollow body fixed at its outer extremity in communication with said heater hose, the inner extremity of said hollow body of said female connector half including an annular flange having a front seating surface and a rear seating surface, first sealing means disposed between said male and female connector halves to provide a fluid tight seal therebetween, said female connector half further having a union sleeve having an annular wall at one extremity for seating against said rear seating surface, and having female threads at its opposite extremity threadable upon said male threads whereby said union sleeve may be rotated in one direction to compress said sealing means against the adjacent end of said male connector thereby to establish a fluid tight connection whereby said backflush coupling may serve as a conduit for coolant in the normal operation of said engine, said union sleeve being rotatable in an opposite direction to enable separation of said male connector half from said female connector half for attachment of a hose to one of said male and female connector halves to apply fluid to said cooling system, and for use of the other of said male and female connectors as a drain; and a cylindrical lock sleeve axially slidable over said body of said male connector half and interengageable with said union sleeve to prevent relative rotation between said union sleeve and said male connector.

7. In an internal combustion engine having a cooling system which includes a heater hose, an improved backflush coupling disposed in fluid communication with said heater hose and comprising:

a male connector half having an elongated hollow body fixed at its outer extremity in communication with said heater hose and provided at its inner extremity with male threads, and further having a radially outwardly disposed lock element;

a female connector half having an elongated hollow body fixed at its outer extremity in communication with said heater hose, the inner extremity of said hollow body of said female connector half including an annular flange having a front seating surface and a rear seating surface, first sealing means disposed between said male and female connector halves to provide a fluid tight seal therebetween, said female connector half further having a union sleeve having an annular wall at one extremity for seating against said rear seating surface, and having female threads at its opposite extremity threadable upon said male threads whereby said union sleeve may be rotated in one direction to compress said sealing means against the adjacent end of said male connector thereby to establish a fluid tight connection whereby said backflush coupling may serve as a conduit for coolant in the normal operation of said engine, said union sleeve being rotatable in an opposite direction to enable separation of said male connector half from said female connector half for attachment of a hose to one of said male and female connector halves to apply fluid to said cooling system, and for use of the other of said male and female connectors as a drain, said opposite extremity of said union sleeve including a plurality of longitudinally extending, circumferentially spaced apart tab seats; and a double ended cylindrical lock sleeve disposed upon said body of said male connector half and having at one end a longitudinally extending locking tab adapted to fit within one of said tab seats, and having at its opposite end a deep tab slot adapted to completely receive said lock element, and further having a shallow tab slot adjacent said deep tab slot adapted to partially receive said lock element, said lock sleeve being longitudinally slidable in one direction to dispose said lock element within said deep tab slot and enable threaded rotation of said union sleeve upon said male connector half to place one of said tab seats adjacent said locking tab, said lock sleeve being oppositely slidable to disengage said lock element from said deep tab slot and locate said locking tab within said one of said tab seats whereby said union sleeve can be partially rotated to align said shallow tab slot for receipt of said lock element to prevent relative rotation of said union sleeve and said male connector half.

8. A backflush coupling according to claim 6 wherein said male connector half includes an annular groove underlying said lock sleeve, and including a resilient element in said groove in frictional engagement with said lock sleeve.

9. In an internal combustion engine having a cooling system which includes a heater hose, an improved backflush coupling disposed in fluid communication with said heater hose and comprising:

a male connector half made of transparent material and having an elongated hollow body fixed at its outer extremity in communication with said heater hose and provided at its inner extremity with male threads; and said body of said male connector half further including a ramp and a ball operative in the presence of fluid flow to roll up said ramp and thereby provide a visual indication of the rate of fluid flow;

a female connector half having an elongated hollow body fixed at its outer extremity in communication with said heater hose, the inner extremity of said hollow body of said female connector half including an annular flange having a front seating surface and a rear seating surface, first sealing means disposed between said male and female connector halves to provide a fluid tight seal therebetween, said female connector half further having a union sleeve having an annular wall at one extremity for seating against said rear seating surface, and having female threads at its opposite extremity threadable upon said male threads whereby said union sleeve may be rotated in one direction to compress said sealing means against the adjacent end of said male connector thereby to establish a fluid tight connection whereby said backflush coupling may serve as a conduit for coolant in the normal operation of said engine, said union sleeve being rotatable in an opposite direction to enable separation of said male connector half from said female connector half for attachment of a hose to one of said male and female connector halves to apply fluid to said cooling system, and for use of the other of said male and female connectors as a drain.

10. In an internal combustion engine having a cooling system which includes a heater hose, an improved backflush coupling disposed in fluid communication with said heater hose and comprising:

a male connector half having an elongated hollow body fixed at its outer extremity in communication with said heater hose and provided at its inner extremity with male threads;

a female connector half having an elongated hollow body fixed at its outer extremity in communication with said heater hose, the inner extremity of said hollow body of said female connector half including an annular flange having a front seating surface and a rear seating surface, first sealing means disposed between said male and female connector halves to provide a fluid tight seal therebetween, said female connector half further having a union sleeve having an annular wall at one extremity for seating against said rear seating surface, and having female threads at its opposite extremity threadable upon said male threads whereby said union sleeve may be rotated in one direction to compress said sealing means against the adjacent end of said male connector thereby to establish a fluid tight connection whereby said backflush coupling may serve as a conduit for coolant in the normal operation of said engine, said union sleeve being rotatable in an opposite direction to enable separation of said male connector half from said female connector half for attachment of a hose to one of said male and female connector halves to apply fluid to said cooling system, and for use of the other of said male and female connectors as a drain, said body of said female connector half including fluid passage means opening from the interior of said body of said female connector half radially outwardly; and annular second sealing means disposed upon said front seating surface and seating upon said fluid passage means, said second sealing means being movable to unseat said fluid passage means upon attainment of a predetermined pressure within said interior of said body of said female connector half.

11. A backflush coupling according to claim 10 and including an annular stop washer disposed between and bearing against said first and second sealing means.

12. A backflush coupling according to claim 11 wherein said stop washer includes an annular face projecting axially beyond the inner end of said body of said female connector half and against said second sealing means to compress said second sealing means against said fluid passage means to greatly increase the pressure necessary to unseat said second sealing means from said fluid passage means.

13. A backflush coupling according to claim 12 wherein the face of said stop washer opposite said annular face is flat whereby, upon reversal of said position of said stop washer, said second sealing means is relatively uncompressed by said flat face.

14. A backflush coupling according to claim 10 wherein said body of said male connector half includes fluid passage means opening from the interior of said body of said male connector half radially outwardly, and including annular third sealing means disposed in overlying relation to said fluid passage means and movable to unseat said fluid passage means upon attainment of a predetermined pressure within said interior of said body of said male connector half.

15. In an internal combustion engine having a cooling system which includes a heater hose, an improved backflush coupling disposed in fluid communication with said heater hose and comprising:

a male connector half having an elongated hollow body fixed at its outer extremity in communication with said heater hose and provided at its inner extremity with male threads; and a female connector half having an elongated hollow body fixed at its outer extremity in communication with said heater hose, the inner extremity of said hollow body of said female connector half including an annular flange having a front seating surface and a rear seating surface, first sealing means disposed between said male and female connector halves to provide a fluid tight seal therebetween, said female connector half further having a union sleeve having fluid passage means extending exteriorly of said union sleeve, said union sleeve further having an annular wall at one extremity for seating against said rear seating surface, and having female threads at its opposite extremity threadable upon said male threads whereby said union sleeve may be rotated in one direction to compress said sealing means against the adjacent end of said male connector thereby to establish a fluid tight connection whereby said backflush coupling may serve as a conduit for coolant in the normal operation of said engine, said union sleeve being rotatable in an opposite direction to enable separation of said male connector half from said female connector half for attachment of a hose to one of said male and female connector halves to apply fluid to said cooling system, and for use of the other of said male and female connectors as a drain, said body of said female connector half further including aspirator means, and further including fluid passage means opening from the exterior of said body of said female connector to said aspiration means whereby air may be drawn into a low pressure region adjacent said aspirator means, said fluid passage means of said union sleeve communicating interiorly of said union sleeve with said fluid passage means opening exteriorly of said female connector body.

16. In an internal combustion engine having a cooling system which includes a heater hose, an improved backflush coupling disposed in fluid communication with said heater hose and comprising:

a male connector half having an elongated hollow body fixed at its outer extremity in communication with said heater hose and provided at its inner extremity with male threads, said body of said male connector half including fluid passage means opening from the interior of said body of said male connector half radially outwardly;

a female connector half having an elongated hollow body fixed at its outer extremity in communication with said heater hose, the inner extremity of said hollow body of said female connector half including an annular flange having a front seating surface and a rear seating surface, first sealing means disposed between said male and female connector halves to provide a fluid tight seal therebetween, said female connector half further having a union sleeve having an annular wall at one extremity for seating against said rear seating surface, and having female threads at its opposite extremity threadable upon said male threads whereby said union sleeve may be rotated in one direction to compress said sealing means against the adjacent end of said male connector thereby to establish a fluid tight connection whereby said backflush coupling may serve as a conduit for coolant in the normal operation of said engine, said union sleeve being rotatable in an opposite direction to enable separation of said male connector half from said female connector half for attachment of a hose to one of said male and female connector halves to apply fluid to said cooling system, and for use of the other of said male and female connectors as a drain; and annular third sealing means disposed in overlying relation to said fluid passage means and movable to unseat said fluid passage means upon attainment of a predetermined pressure within said interior of said body of said male connector half.

* * * * *